(12) United States Patent
Lee et al.

(10) Patent No.: US 8,966,609 B2
(45) Date of Patent: Feb. 24, 2015

(54) AUTHENTICATION METHOD AND APPARATUS FOR DETECTING AND PREVENTING SOURCE ADDRESS SPOOFING PACKETS

(71) Applicant: Electronics and Telecommunications Research Institute, Daejeon (KR)

(72) Inventors: Sang-Woo Lee, Daejeon (KR); Dong IL Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 127 days.

(21) Appl. No.: 13/687,187

(22) Filed: Nov. 28, 2012

(65) Prior Publication Data

US 2013/0152189 A1     Jun. 13, 2013

(30) Foreign Application Priority Data

Dec. 9, 2011    (KR) ........................ 10-2011-0132070

(51) Int. Cl.
*G06F 9/00*     (2006.01)
*H04L 29/06*    (2006.01)

(52) U.S. Cl.
CPC ................................ *H04L 63/1408* (2013.01)
USPC .............................. 726/13; 713/153; 716/163

(58) Field of Classification Search
CPC . H04L 63/0227; H04L 63/126; H04L 63/101; H04L 63/0236; H04L 63/1416
See application file for complete search history.

(56) References Cited

U.S. PATENT DOCUMENTS

| | | | |
|---|---|---|---|
| 7,752,324 B2 | 7/2010 | Hamadeh et al. | |
| 2011/0154475 A1* | 6/2011 | Wu | 726/13 |
| 2011/0264908 A1* | 10/2011 | Feng et al. | 713/153 |

FOREIGN PATENT DOCUMENTS

| | | |
|---|---|---|
| JP | 2004-363913 A | 12/2004 |
| KR | 1020050097170 A | 10/2005 |
| KR | 1020110059963 A | 6/2011 |

OTHER PUBLICATIONS

David G. Andersen et al., "Accountable Internet Protocol (AIP)", Proceeding of ACM SIGCOMM, 2008.

* cited by examiner

*Primary Examiner* — Nirav B Patel
*Assistant Examiner* — Mohammed Waliullah

(57) ABSTRACT

An authentication apparatus for detecting and preventing a source address spoofing packet, includes a packet reception unit configured to receive a packet from a previous node or a user host; a self-assurance type ID generation unit configured to generate a self-assurance type ID of a source node of the received packet; and a self-assurance type ID verification unit configured to determine whether the source address of the received packet has been spoofed. Further, the authentication apparatus includes a white list storage unit configured to store a reliable source node; a black list storage unit configured to store an unreliable source node; and a packet transmission unit configured to transmit the packet whose source has been verified through the self-assurance type ID verification unit to a next network node.

9 Claims, 5 Drawing Sheets

AUTHENTICATION METHOD AND APPARATUS FOR DETECTING AND PREVENTING SOURCE ADDRESS SPOOFING PACKETS

CROSS-REFERENCE TO RELATED APPLICATION(S)

The present invention claims priority of Korean Patent Application No. 10-2011-0132070, filed on Dec. 9, 2011, which is incorporated herein by reference.

FIELD OF THE INVENTION

The present invention relates to detection and prevention of an address spoofing packet; and more particularly, to an authentication method and apparatus for detecting and preventing a source address spoofing packet which are capable of basically defending against a malicious attack such as a distributed denial of service denial (DDoS).

BACKGROUND OF THE INVENTION

In general, the Internet based on the current transmission control protocol/Internet protocol (TCP/IP) is very vulnerable to security when a malicious user arbitrarily changes a source and a destination. In particular, a basic cause of a distributed denial of service (DDoS) attack lies in distribution of a packet whose source address is changed.

Thus, various countermeasure methods for detecting a source address spoofing packet have been proposed. Representative countermeasure methods may include a detection method using a statistical technique, a filtering method in a router, and the like. An attack detection technique using a statistical technique calculates the frequency number of each source IP address is calculated, based on which a distribution model of source addresses is generated, and determines whether a source IP address of a packet has been selected randomly by an attack tool based on the generated distribution model.

This has a structure of detecting an attack by using the fact that a distribution of a source address in actual normal traffic and that of attack traffic are different. Finally, there is a method in which a network input/output terminal of a router filters a packet having an invalid source address or filters a packet received by an erroneous interface based on a routing table.

However, in spite of the various conventional methods for detecting source address spoofing packets, an attack of DDoS by source address spoofing packets is still made. A basic reason thereof is because an IP layer handles only a forwarding function of packets without having a function of verifying a source address of a transferred packet.

SUMMARY OF THE INVENTION

In view of the above, the present invention provides an authentication method and apparatus for detecting and preventing a source address spoofing packet, which are capable of verifying a packet source by using a self-assurance type ID by which a transmitter assures a receiver that the transmitter has a proper address, without an intervention or help of a third party.

Further, the present invention provides an authentication method and apparatus for detecting and preventing a source address spoofing packet, which are capable of basically detecting whether a source address of a packet is spoofed by a network layer and forwarding only a packet having a normal source address in a router.

In accordance with a first aspect of the present invention, there is provided an authentication apparatus for detecting and preventing a source address spoofing packet, the apparatus including: a packet reception unit configured to receive a packet from a previous node or a user host; a self-assurance type ID generation unit configured to generate a self-assurance type ID of a source node of the received packet; a self-assurance type ID verification unit configured to determine whether the source address of the received packet has been spoofed by using the self-assurance type ID; a white list storage unit configured to store a reliable source node based on the result of determination of the source address spoofing; a black list storage unit configured to store an unreliable source node based on the result of determination of the source address spoofing; and a packet transmission unit configured to transmit the packet whose source has been verified through the self-assurance type ID verification unit to a next network node.

The self-assurance type ID generation unit may generate a digital signature value Sign1 obtained by signing a source address of the input packet by using a private key, and may generate a result of hashing the digital signature value Sign1 and a public key, as a self-assurance type ID.

Further, when a length of the self-assurance type ID is not equal to a length of a hash function, the self-assurance type ID generation unit may generate a random number R1, generates a middle value T1 as a result of hashing the source address, the public key, and the random number, may generate a digital signature value Sign2 by signing the source address and the random number by using a private key, and may generate a result of hashing the digital signature value Sign2 and the public key, as the self-assurance type ID.

Further, when the self-assurance type ID verification unit receives a self-assurance type ID of a packet received from the packet reception unit, the self-assurance type ID verification unit may determine whether the self-assurance type ID has been stored in a white list in which reliable source nodes are stored, and when the self-assurance type ID has been stored in the white list, the self-assurance type ID verification unit may transfer the packet to the packet transmission unit.

Further, when the self-assurance type ID of the packet has not been stored in the white list in which reliable source nodes are stored, the self-assurance type ID verification unit may perform a procedure for verifying validity of the self-assurance type ID, and when the verification result is abnormal, the self-assurance type ID verification unit may store the source node of the packet in a black list and deletes the packet.

Further, when the self-assurance type ID of the packet has not been stored in the white list in which reliable source nodes are stored, the self-assurance type ID verification unit may perform a procedure for verifying validity of the self-assurance type ID, and when the verification result is normal, the self-assurance type ID verification unit may store the source node of the packet in the white black list and transfers the packet to the packet transmission unit.

In accordance with a second aspect of the present invention, there is provided an authentication method for detecting and preventing a source address spoofing packet, the method including: receiving a packet from a previous node or a user host; generating a self-assurance type ID of a source node of the received packet; verifying whether the source address of the received packet has been spoofed by using the self-assurance type ID; storing a reliable source node in a white list, based on the result of verification of the source address spoofing; storing an unreliable source node in a black list, based on the result of verification of the source address spoofing; and transmitting the packet whose source has been verified through the self-assurance type ID verification to a next network node.

Further, said generating a self-assurance type ID may comprise generating a digital signature value Sign1 obtained by signing a source address of the input packet by using a private key; and generating a result of hashing the digital signature value Sign1 and a public key, as a self-assurance type ID.

Further, said generating a self-assurance type ID may comprise, when a length of the self-assurance type ID is not equal to a length of a hash function, generating a random number R1; generating a middle value T1 as a result of hashing the source address, the public key, and the random number; generating a digital signature value Sign2 by signing the source address and the random number by using a private key; generating a result of hashing the digital signature value Sign2 and the public key, as the self-assurance type ID.

Further, said verifying whether the source address of the received packet has been spoofed may comprise, when a self-assurance type ID of the packet is received, determining whether the self-assurance type ID has been stored in a white list in which reliable source nodes are stored; and when the self-assurance type ID has been stored in the white list in which reliable source nodes are stored, verifying the self-assurance type ID.

Furthermore, the method may further comprise, when the self-assurance type ID of the packet has not been stored in the white list, performing a procedure for verifying validity of the self-assurance type ID; and when the verification result is abnormal, storing the source node of the packet in a black list and deleting the packet.

The method may further comprise, when the verification result is normal, storing the source node of the packet in the white black list and transferring the packet to said transmitting the packet.

In the system for verifying a source address for detecting and preventing a source address spoofing packet in accordance with the present invention, a network layer fundamentally detects a source address spoofing packet and a router forwards only a packet having a normal source address, thereby fundamentally defending against a malicious attack such as DDoS or the like.

That is, a source of a packet may be verified by using a self-assurance type ID by which a transmitter may assure a receiver that the transmitter has a proper address without intervention or help of a third party, and a network layer fundamentally detects whether a source address of a packet has been spoofed to allow a router to forward only a packet having a normal source address, thereby fundamentally defending against a malicious attack such as DDoS or the like.

Further, the system in accordance with the present invention may enhance stability by using a second hash value even when a length of a self-assurance type ID is shorter than a length of a hash function, in generating the self-assurance type ID.

BRIEF DESCRIPTION OF THE DRAWINGS

The objects and features of the present invention will become apparent from the following description of preferred embodiments, given in conjunction with the accompanying drawings, in which.

DETAILED DESCRIPTION OF THE EMBODIMENT

Figure 1:
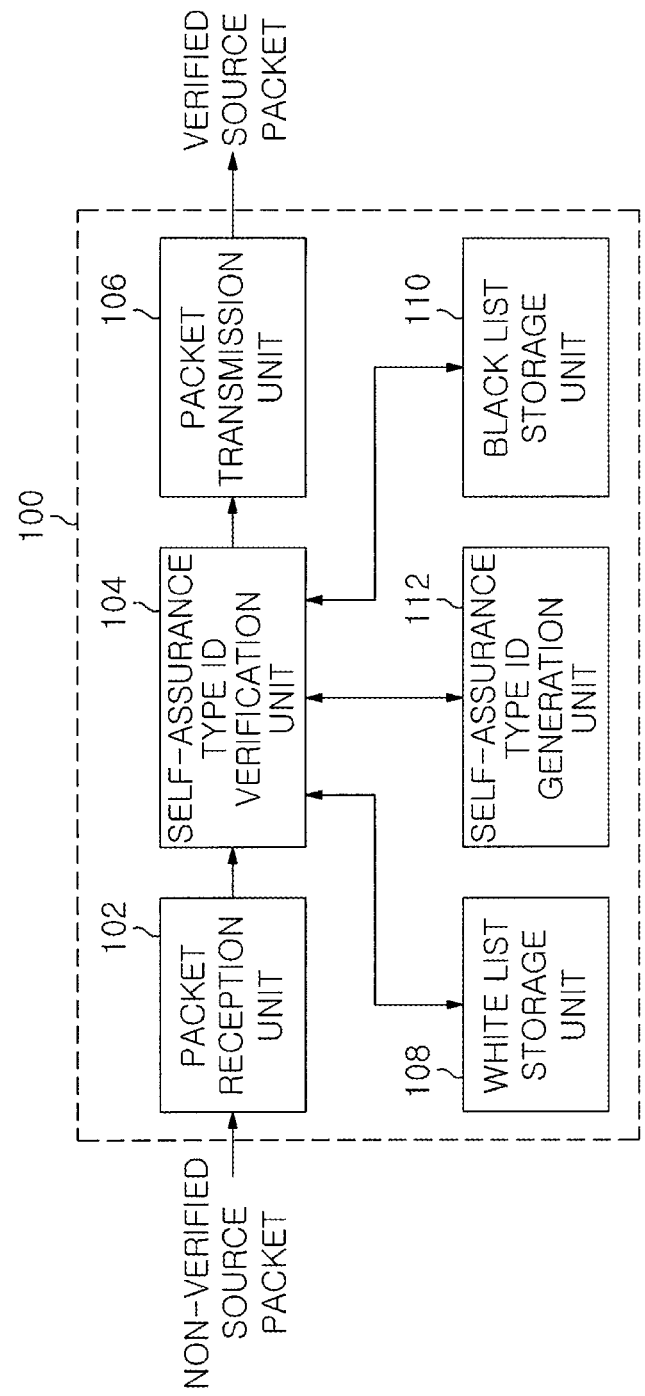
FIG. 1 is a detailed block diagram of an authentication apparatus for detecting and preventing a source address spoofed packet in accordance with an embodiment of the present invention.

Embodiments of the present invention will be described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of each step in respective blocks of block diagrams and a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram.

Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective sequences of the sequence diagram.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions.

Hereinafter, embodiments of the present invention will be described in detail with the accompanying drawings which form a part hereof.

FIG. 1 shows a block diagram of an authentication apparatus 100 for detecting and preventing a source address spoofing packet in accordance with an embodiment of the present invention. The authentication apparatus 100 includes a packet reception unit 102, a self-assurance type ID verification unit 104, a white list storage unit 108, a black list storage unit 110, a self-assurance type ID generation unit 112, and a packet transmission unit 106.

The authentication apparatus 100 of the present invention basically serves to verify a source of a packet using a self-assurance type ID. The self-assurance type ID refers to an identifier by which a transmitter may be able to assure a receiver that the transmitter has a proper address without an intervention or help of a third party.

The packet reception unit 102 receives a packet from a previous node or a user host.

The self-assurance type ID verification unit 104 determines whether a source address of the received packet has been spoofed.

The white list storage unit 108 stores a reliable source ID based on the results of the determination of source address spoofing.

The black list storage unit 110 stores an unreliable source ID based on the results of the determination of source address spoofing. The self-assurance type ID generation unit 112 generates the self-assurance type ID.

The packet transmission unit 106 transmits the source-verified packet to a next network node based on the results of the determination of source address spoofing.

Figure 2:
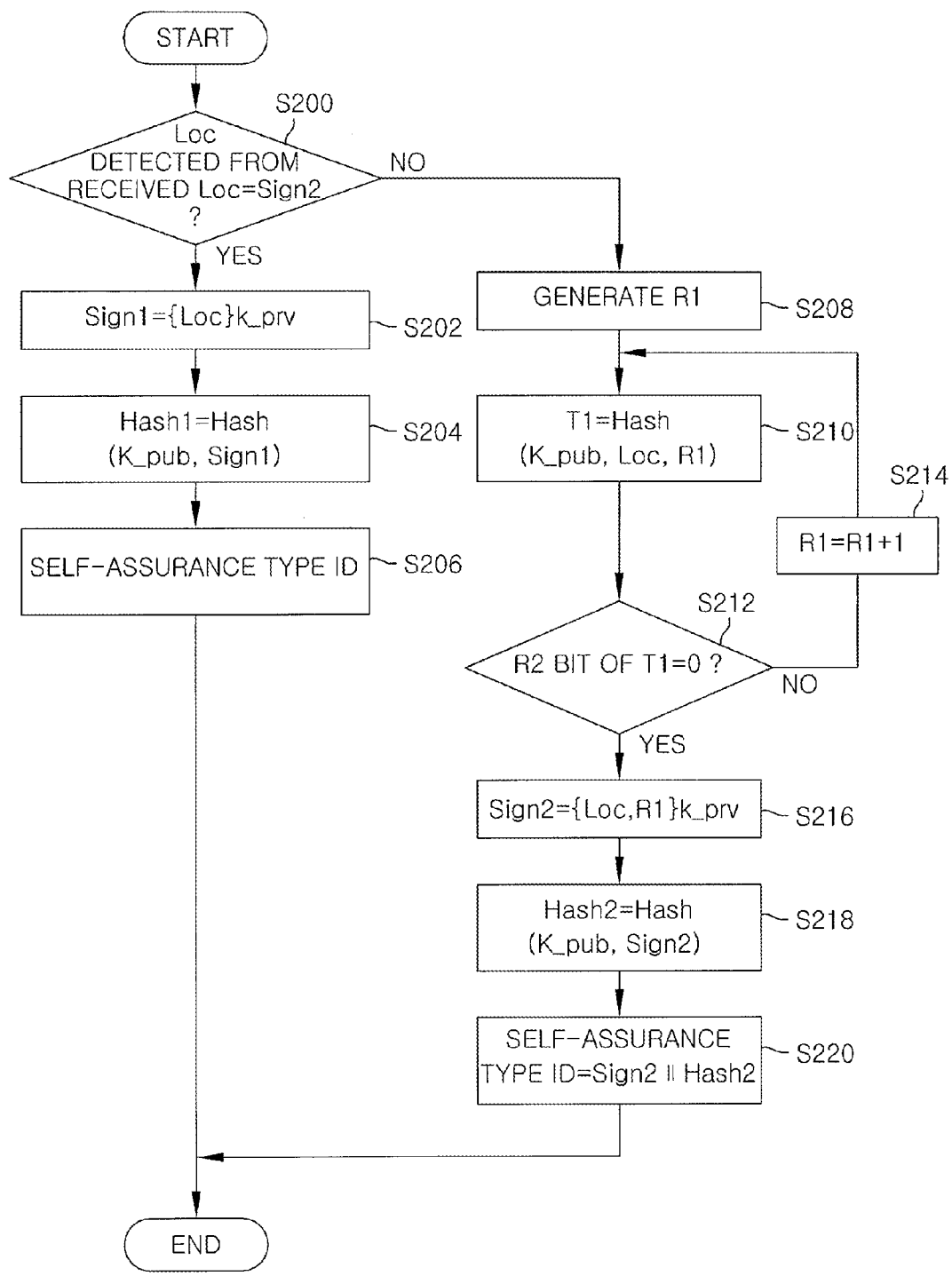
FIG. 2 is a flow chart illustrating a process of generating a self-assurance type ID in accordance with the embodiment of the present invention.

FIG. 2 is a control flow chart illustrating an operation of generating a self-assurance type ID by the self-assurance type ID generation unit 112 in accordance with the embodiment of the present invention.

The self-assurance type ID is conceptually generated by a public key of a corresponding node and a hash value of position information, i.e., address information. In a hash algorithm used herein, cryptological hash functions such as SHA1, MD5, and the like are used. When a length of the self-assurance type ID is shorter than an output length of the hash function, an additional step is required in order to increase security.

Symbols used in the process of FIG. 2 may be defined as follows.

Loc is an address representing a position in a network of a node. Sign is a digital signature value using a public key encryption algorithm. K_pry is a private key in the public key encryption algorithm. It is used to generate a digital signature. K_pub is a public key in the public key encryption algorithm. It is used to verify a digital signature.

R1 is a random number. T1 is a middle value calculated when a length of the self-assurance type ID is shorter than the output length of the hash. R2 is the number of bits from the most significant bit of the T1 value. Hash is a cryptological hash function (e.g., SHA-1, MD5 and the like)

Hereinafter, the embodiment of the present invention will be described in detail with reference to FIGS. 1 and 2.

First, in step S200, when a non-verified source packet is input, the self-assurance type ID generation unit 112 compares a length (Loc) of the self-assurance type ID of the corresponding packet is equal to an output length of a hash function (Loc detected from Sign2).

Here, in step S202, when the length of the self-assurance type ID and the output length of the hash function are equal, the self-assurance type ID generation unit 112 generates a digital signature value Sign1 obtained by signing by using the address Loc of the input packet in the network and the private key K_prv. Subsequently, in step S204, the self-assurance type ID generation unit 112 generates digital signature value Sign1 and Hash1 as a result of hashing the public key K_pub, and AND-operates the digital signature value Sign1 and Hash1 to generate the self-assurance type ID in step S206.

However, in step S208, when the length of the self-assurance type ID is shorter than the output length of the hash function, the self-assurance type ID generation unit 112 generates a random number R1.

Then, in step S210, the self-assurance type ID generation unit 112 generates T1 as a result of hashing a value obtained by AND-operating the public key K_pub, Loc, and R1.

Subsequently, the self-assurance type ID generation unit 112 determines whether values from the most significant bit to the bit R2 included in T1 are 0 in step S212. If it is determined that the values from the most significant bit to the bit R2 included in T1 are not 0 in step S212, the self-assurance type ID generation unit 112 increases R1 by 1 in step S214, and repeats steps S210 to S214.

On the other hand, if it is determined that the values from the most significant bit to the bit R2 included in T1 are 0 in step S212, the self-assurance type ID generation unit 112 generates a digital signature value Sign2 in which Loc and R1 are signed by using the private key K_pry in step S216.

Then, in step S218, the self-assurance type ID generation unit 112 generates Hash2 as a result of hashing the digital signature value Sign2 and the public key K_pub and, in step S220, ANDs the digital signature value Sign2 and Hash2 to generate the self-assurance type ID.

Figure 3:
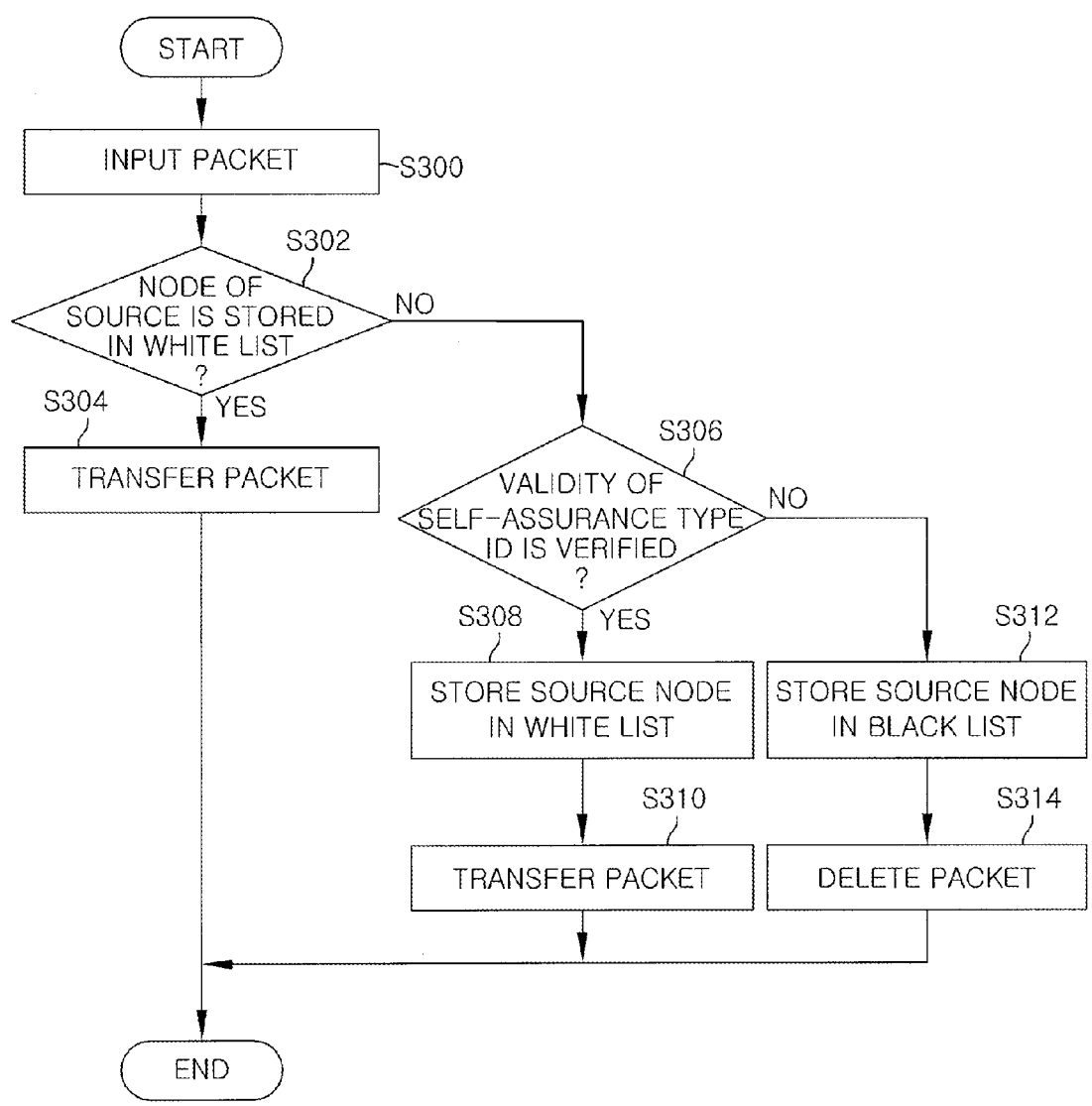
FIG. 3 is a flow chart illustrating a process of verifying a self-assurance type ID in accordance with the embodiment of the present invention.

FIG. 3 is a control flow chart illustrating an operation of verifying a self-assurance type ID by the self-assurance type ID verification unit 104 in accordance with the embodiment of the present invention. Hereinafter, the embodiment of the present invention will be described with reference to FIGS. 1 and 3.

First, when a packet is introduced to a packet source address verifying apparatus, the packet reception unit 102 transfers a self-assurance type ID of the packet to the self-assurance type ID verification unit 104.

Then, in step S300, the self-assurance type ID verification unit 104 recognizes the input of the packet and, in step S302, extracts a source address of the self-assurance type ID of the corresponding packet to determine whether the corresponding source address has been stored in the white list storage unit 108 in which reliable source nodes are stored.

Here, if it is determined that the source address with respect to the self-assurance type ID of the packet has been stored in the white list storage unit 108 in which reliable source nodes are stored based on the results of determination of source address spoofing in step S302, the self-assurance type ID verification unit 104 transfers the packet to a next node through the packet transmission unit 106 in step S304.

On the other hand, if it is determined that the source address of the self-assurance type ID of the packet has not been stored in the white list storage unit 108 in which reliable source nodes are stored based on the results of determination of source address spoofing in step S302, the self-assurance type ID verification unit 104 performs a self-assurance type ID validity verification procedure for determining whether the self-assurance type ID has been properly generated in step S306.

Here, if it is determined that the self-assurance type ID of the input packet is verified to have been properly generated based on the results of verification of the self-assurance type ID validity in step S306, the self-assurance type ID verification unit 104 stores the source node of the packet in the white list storage unit 108 in step S308, and transfers the packet to a next node in step S310.

On the other hand, if it is determined that the self-assurance type ID of the input packet is not verified to have been properly generated based on the results of verification of the self-assurance type ID validity in step S306, the self-assurance type ID verification unit 104 stores the source node of the packet in the black list storage unit 110 in step S312, and deletes the packet in step S314.

Figure 4:
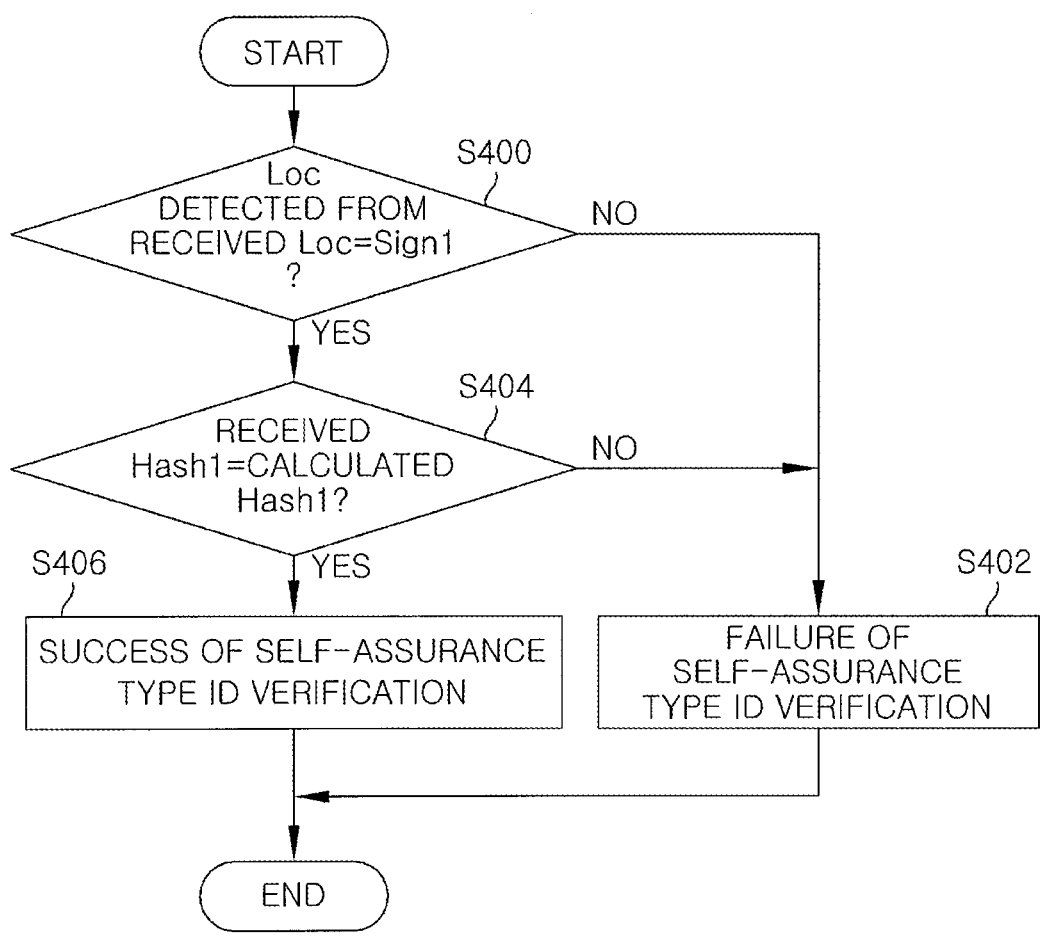
FIG. 4 is a flow chart illustrating a process of verifying validity of a self-assurance type ID in accordance with the embodiment of the present invention.

FIG. 4 illustrates in more detail a procedure for verifying validity of the self-assurance type ID in FIG. 3 when a length of the self-assurance type ID is equal to an output length of a hash function, in accordance with the embodiment of the present invention. Hereinafter, the embodiment of the present invention will be described in detail with reference to FIGS. 1, 3, and 4.

First, in step S400, the self-assurance type ID verification unit 104 determines whether a calculated Loc value and an Loc value stored in a source address of the packet are equal based on a result of verifying the signature of the Sign1 value as a digital signature value by using a public key K_pub to thereby verify validity of Sign1. As a result of the determination in step S400, if it is determined that the result is abnormal, i.e., the calculated Loc value and the Loc value stored in a source address of the packet are not equal, the self-assurance type ID verification unit 104 outputs a failure of the self-assurance type ID verification in step S402, and terminates the procedure.

On the other hand, if it is determined that the calculated Loc value and the Loc value stored in a source address of the packet are equal based on the result of verifying the signature of the Sign1 value as a digital signature value by using a public key K_pub in step S400, the self-assurance type ID verification unit 104 calculates Hash1 by using the public key K_pub and the digital signature value Sign1, and determines whether the calculated Hash1 and the received Hash1 are identical in step S404.

Here, if it is determined that the calculated Hash1 and the received Hash1 are identical in step S404, the self-assurance type ID verification unit 104 outputs a success of the self-assurance type ID verification in step S406. On the other hand, if it is determined that the calculated Hash1 and the received Hash1 are not identical in step S404, the self-assurance type ID verification unit 104 outputs a failure of the self-assurance type ID verification in step S402, and terminates the procedure.

Figure 5:
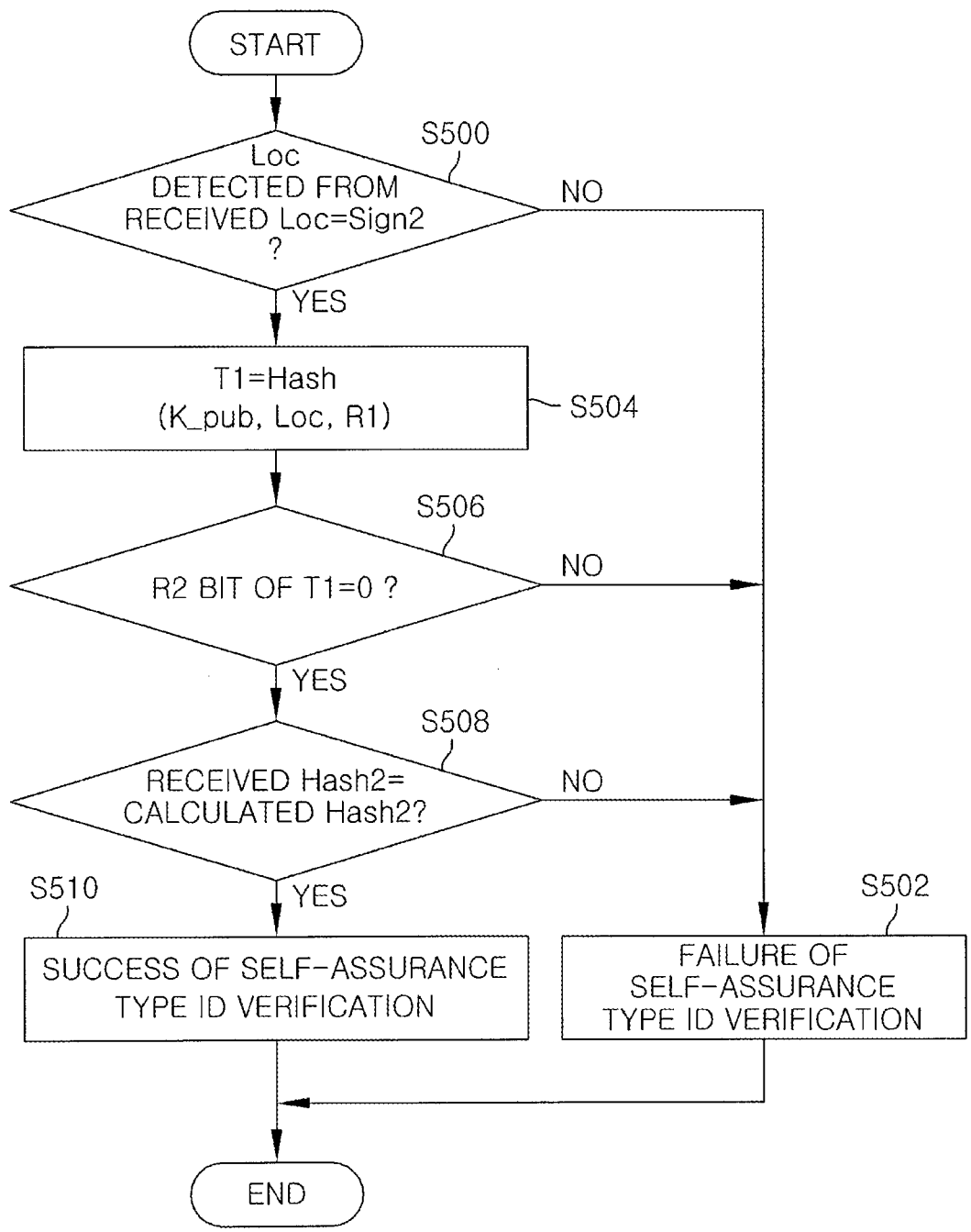
FIG. 5 is a flow chart illustrating a process of verifying validity of a self-assurance type ID in accordance with another embodiment of the present invention.

FIG. 5 illustrates in more detail a procedure for verifying validity of the self-assurance type ID in FIG. 3 when a length of the self-assurance type ID is shorter than the output length of the hash function, in accordance with the embodiment of the present invention.

In step S500, the self-assurance type ID verification unit 104 determines whether a calculated Loc value and a Loc value stored in a source address of the packet are equal based on a result of verifying the signature of the Sign2 value as a digital signature value by using a public key K_pub to thereby verify validity of Sign2. If it is determined that the result is abnormal, i.e., the calculated Loc value and the Loc value stored in a source address of the packet are equal in step S500, the self-assurance type ID verification unit 104 outputs a failure of the self-assurance type ID verification in step S502, and terminates the procedure.

On the other hand, the calculated Loc value and the Loc value stored in a source address of the packet are equal in step S500, the self-assurance type ID verification unit 104 generates a hash value T1 by using the public key K_pub, Loc, and the value R1 in step S504. Then, in step S506, the self-assurance type ID verification unit 104 determines whether values from the most significant bit to the bit R2 included in T1 are 0. If it is determined that values from the most significant bit to the bit R2 included in T1 are not 0 in step S506, the self-assurance type ID verification unit 104 outputs a failure of the self-assurance type ID verification in step S502, and terminates the procedure.

On the other hand, if it is determined that values from the most significant bit to the bit R2 included in T1 are 0 in step S506, the self-assurance type ID verification unit 104 calculates Hash2 by using the public key K_pub and Sign2, and determines whether the calculated Hash2 and the received Hash2 are identical in step S508.

Here, if it is determined that the calculated Hash2 and the received Hash2 are identical in step S508, the self-assurance type ID verification unit 104 outputs a success of the self-assurance type ID verification in step S510. On the other hand, if it is determined that the calculated Hash2 and the received Hash2 are not identical in step S508, the self-assurance type ID verification unit 104 outputs a failure of the self-assurance type ID verification in step S502, and terminates the procedure.

As described above, in the system for verifying a source address for detecting and preventing a source address spoofing packet in accordance with the present invention, a network layer fundamentally detects a source address spoofing packet and a router forwards only a packet having a normal source address, thereby fundamentally defending against a malicious attack such as DDoS or the like.

That is, in the present invention, a source of a packet may be verified by using a self-assurance type ID by which a transmitter may assure a receiver that the transmitter has a proper address without intervention or help of a third party, and a network layer fundamentally detects whether a source address of a packet has been spoofed to allow a router to forward only a packet having a normal source address, thereby fundamentally defending against a malicious attack such as DDoS or the like.

Further, the system in accordance with the present invention enhances stability by using a second hash value even when a length of a self-assurance type ID is shorter than a length of a hash function, in generating the self-assurance type ID.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An authentication apparatus for detecting and preventing a source address spoofing packet, the apparatus comprising:
   a packet reception unit configured to receive a packet from a previous node or a user host;
   a self-assurance type identification (ID) generation unit configured to generate a self-assurance type ID of a source node of the received packet by:
   generating a digital signature value Sign1 obtained by signing a source address of the input packet by using a private key;
   generating a result of hashing the digital signature value Sign1 and a public key, as the self-assurance type; and
   when a length of the self-assurance type ID is not equal to a length of a hash function:
   generating a random number R1,
   generates a middle value T1 as a result of hashing the source address, the public key, and the random number,
   generating a digital signature value Sign2 by signing the source address and the random number by using a private key, and
   generating a result of hashing the digital signature value Sign2 and the public key, as the self-assurance type ID, replacing the previously generated self-assurance type ID with newly generated self assurance type ID;
   a self-assurance type ID verification unit configured to determine whether the source address of the received packet has been spoofed by using the self-assurance type ID;
   a white list storage unit configured to store an identification of a reliable source node based on the result of determination of the source address spoofing;
   a black list storage unit configured to store an identification of an unreliable source node based on the result of determination of the source address spoofing; and
   a packet transmission unit configured to transmit the packet whose source has been verified through the self-assurance type ID verification unit to a next network node.

2. The authentication apparatus of claim wherein when the self-assurance type ID verification unit receives a self-assurance type ID of a packet received from the packet reception unit, the self-assurance type ID verification unit determines whether the self-assurance type ID has been stored in a white list in which reliable source nodes are stored, and when the self-assurance type ID has been stored in the white list, the self-assurance type ID verification unit transfers the packet to the packet transmission unit.

3. The authentication apparatus of claim 2, wherein when the self-assurance type ID of the packet has not been stored in the white list in which reliable source nodes are stored, the self-assurance type ID verification unit performs a procedure for verifying validity of the self-assurance type ID, and when the verification result is abnormal, the self-assurance type ID verification unit stores the source node of the packet in a black list and deletes the packet.

4. The authentication apparatus of claim 3, wherein when the self-assurance type ID of the packet has not been stored in the white list in which reliable source nodes are stored, the self-assurance type ID verification unit performs a procedure for verifying validity of the self-assurance type ID, and when the verification result is normal, the self-assurance type ID verification unit stores the source node of the packet in the white list and transfers the packet to the packet transmission unit.

5. An authentication method for detecting and preventing a source address spoofing packet, the method comprising:
   receiving a packet from a previous node or a user host;
   generating a self-assurance type ID of a source node of the received packet, wherein generating the self-assurance type ID includes, when a length of the self-assurance type ID is not equal to a length of a hash function:
   generating a random number R1;
   generating a middle value T1 as a result of hashing the source address, the public key, and the random number;
   generating a digital signature value Sign2 by signing the source address and the random number by using a private key;
   generating a result of hashing the digital signature value Sign2 and the public key, as the self-assurance type ID;
   verifying whether the source address of the received packet has been spoofed by using the self-assurance type ID;
   storing a reliable source node in a white list, based on the result of verification of the source address spoofing;
   storing an unreliable source node in a black list, based on the result of verification of the source address spoofing; and
   transmitting the packet whose source has been verified through the self-assurance type ID verification to a next network node.

6. The authentication method of claim 5, wherein generating a self-assurance type ID comprises:
   generating a digital signature value Sign1 obtained by signing a source address of the input packet by using a private key; and
   generating a result of hashing the digital signature value Sign1 and a public key, as a self-assurance type ID.

7. The authentication method of claim 5, wherein verifying whether the source address of the received packet has been spoofed comprises:
   when a self-assurance type ID of the packet is received, determining whether the self-assurance type ID has been stored in a white list in which reliable source nodes are stored; and
   when the self-assurance type ID has been stored in the white list in which reliable source nodes are stored, verifying the self-assurance type ID.

8. The authentication method of claim 7, further comprising:
   when the self-assurance type ID of the packet has not been stored in the white list performing a procedure for verifying validity of the self-assurance type ID; and
   when the verification result is abnormal, storing the source node of the packet in the black list and deleting the packet.

9. The authentication method of claim 8, further comprising, when the verification result is normal, storing the source node of the packet in the white list and transferring the packet to said transmitting the packet.

* * * * *